Oct. 13, 1964 J. B. SMITH 3,152,816
PIPE FLANGE REPAIR CLAMP
Filed Aug. 8, 1962 2 Sheets-Sheet 1

INVENTOR.
JOSEPH B. SMITH
BY
RICHEY, McNENNY & FARRINGTON.
Donald W. Farrington
ATTORNEYS

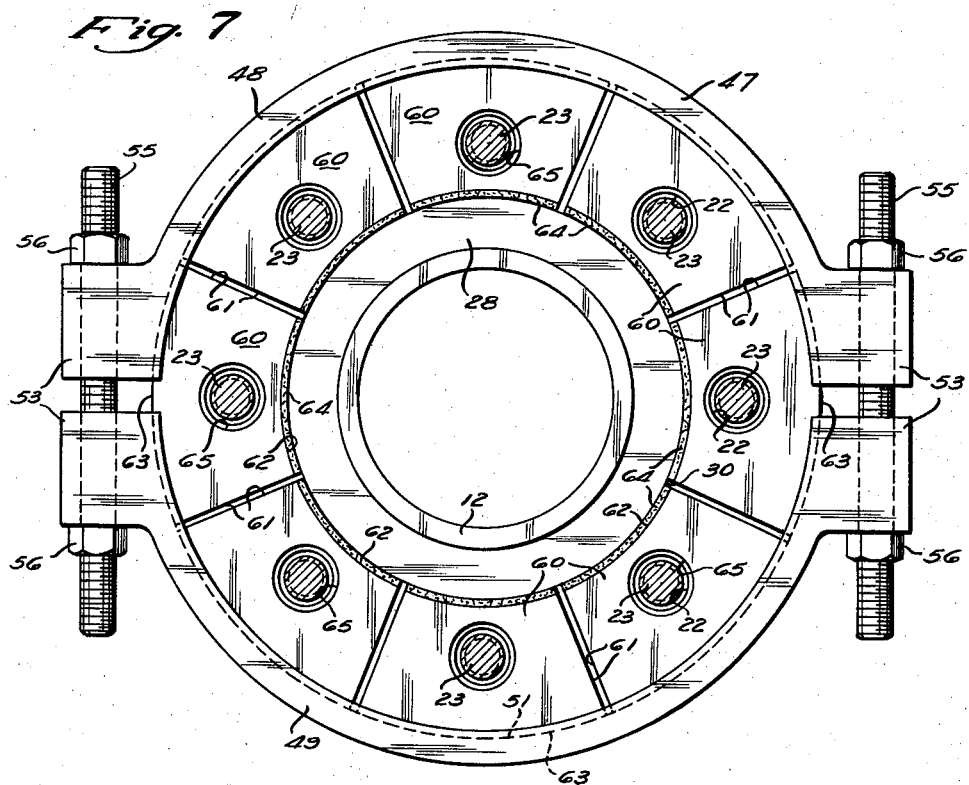
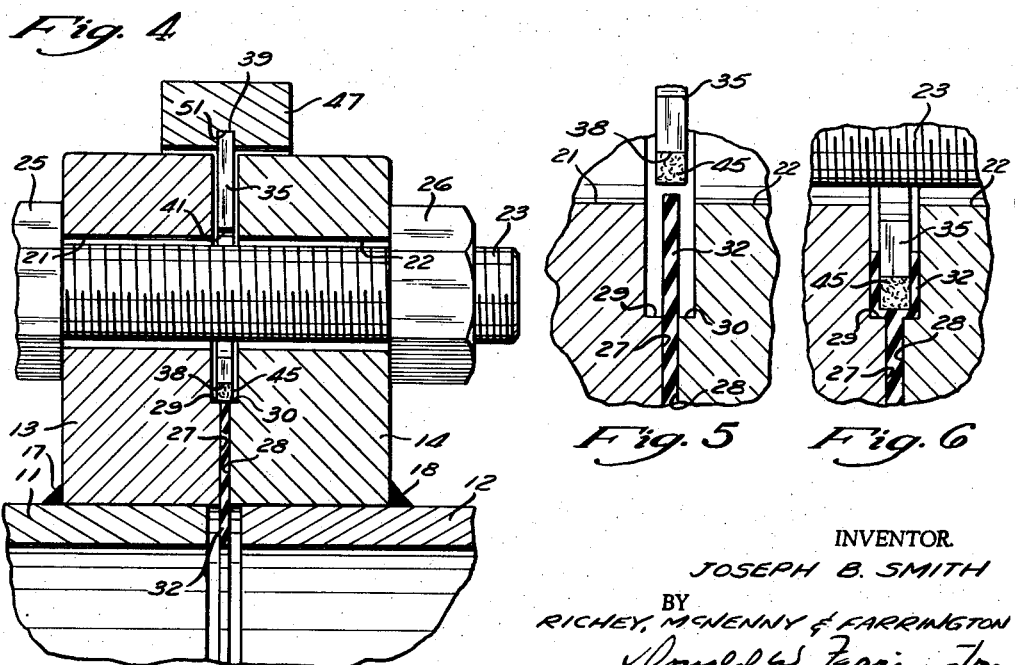

United States Patent Office 3,152,816
Patented Oct. 13, 1964

3,152,816
PIPE FLANGE REPAIR CLAMP
Joseph B. Smith, 5350 W. 130th St., Cleveland 30, Ohio
Filed Aug. 8, 1962, Ser. No. 215,633
8 Claims. (Cl. 285—15)

This invention relates generally to flanged pipe couplings and more particularly to a repair clamp for sealing leaking flanged pipe couplings.

Flanged pipe couplings are widely used for connecting together sections of pipe in larger sizes and operating at moderate to high pressures. These couplings consist of a flange member secured to each of the pipe ends in a suitable manner, such as by welding, and which have radially extending flange portions having a diameter considerably greater than that of the pipe. The flanges are brought into face to face contact and are held together by a plurality of bolts or studs extending through axial holes around the periphery of the flange outward of the pipe. To provide a leak-free seal in these couplings, various configurations of seals between the flanges have been proposed, but the most common is to provide a raised face on the inner portion of each of the flange faces between the bolt holes and the pipe. When the two flanges are brought into contact, an annular gasket is placed between the raised surfaces and when the two flanges are clamped together by the bolts, these raised faces press the gasket material tightly between them to prevent leakage.

From time to time, such flanged pipe couplings may begin to leak, usually because the gasket material between the raised faces has been dissolved, corroded or otherwise damaged. To repair such a leak, it has previously been necessary to shut down the line and drain it of its contents, after which all of the bolts or studs in the flanges are removed so that the joint can be separated to allow removal of the old gasket and the substitution of a new one, after which the coupling is reassembled. This procedure has the disadvantage that the time and labor required in taking the coupling apart and putting it back together is relatively high, and often even more important, the shutting down of the line may be extremely expensive in cases where the line is required to handle a continuous flow, the interruption of which would require the shutting off of various machines and equipment and the interruption of their operation for often a much greater length of time than that actually required to disassemble the coupling and replace the leaking gasket.

Applicant's invention overcomes these problems by providing a repair clamp which can be applied to a leaking pipe flange fitting to stop the leak and repair it without disassembling the flange and without interruption of the flow through the pipe. In the present invention, advantage is taken of the fact that in the raised face type of pipe flange, the portions of the flange outward from the raised face are spaced apart an axial gap equal to the combined thicknesses of the raised faces on both flanges and the gasket between them. With applicant's repair clamp, flat segments having a thickness slightly less than the spacing between the flanges are inserted into this gap, using as many segments as there are bolts clamping the flanges together. Each of the segments carries a strip of gasketing or sealing material on its inner peripheral face which extends to a point adjacent the outer periphery of the raised flanges and the gasket between them. The segments are inserted into the space so that the gasket material on the segments comes into contact with either the gasket material between the raised faces or with the raised faces themselves, and the segments extend radially outward beyond the outer periphery of the flanges. A clamp formed from two semi-circular members is then placed around the flange and has a groove to receive a projecting portion of the segments. The halves of the clamp are then drawn together and force the segments radially inward to press and hold the sealing material on the inner faces in contact with the existing gasket or the raised flanges and positively seal against any leakage at this point. Since the two flanges remain clamped together at all times during assembly of the repair clamp, and the original gasket between the raised faces is left in place, the repair clamp can easily be applied to an existing pipe flange without interfering with the existing sealing of the joint and the flow through the pipe.

Further and additional objects and advantages of this invention relating to simplicity of construction, low cost of manufacture and ease of installation will readily become apparent to those skilled in the art upon a more complete understanding of the invention as shown in the accompanying drawing and described in the following detailed description.

In the drawings:

FIGURE 4 is a view similar to FIGURE 3 before the semi-circular clamps have been tightened;

FIGURE 5 is an enlarged fragmentary cross-sectional view showing the alternative method of applying the clamps without removing all of the original gasket;

FIGURE 6 is a view similar to FIGURE 5 after the segment plate has been clamped into sealing position; and FIGURE 7 is a view similar to FIGURE 1 but showing a clamp having a modified form of segment plate.

Figure 1:
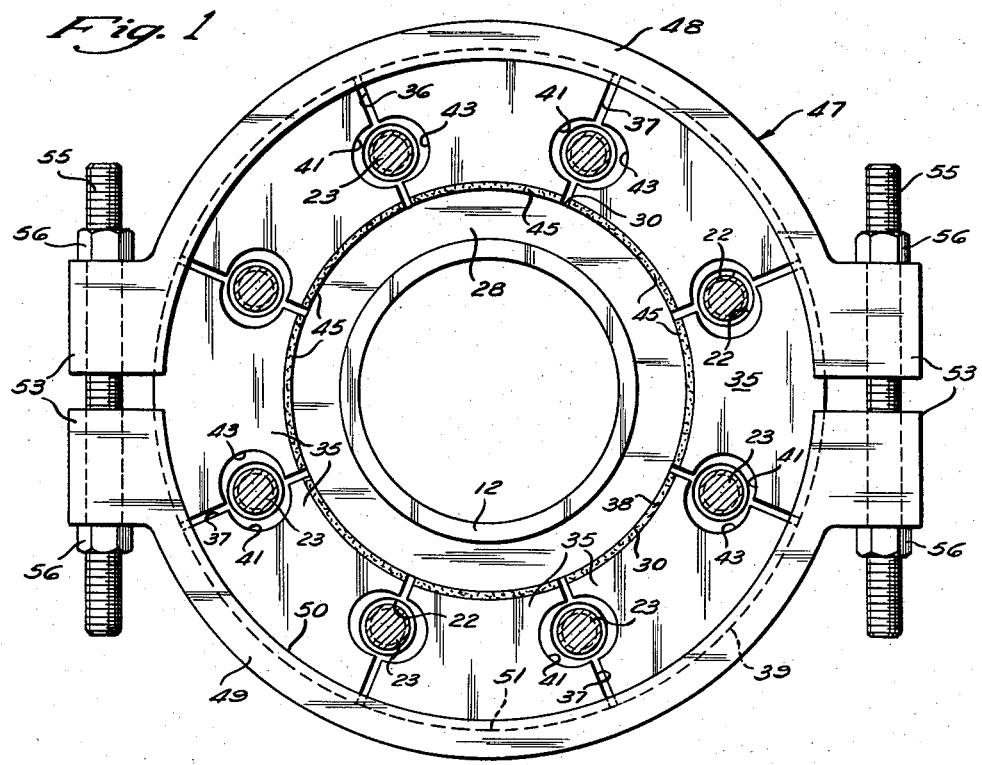
FIGURE 1 is an elevational view of a pipe flange joint incorporating the preferred embodiment of the repair clamp with the one flange broken away.
Figure 3:
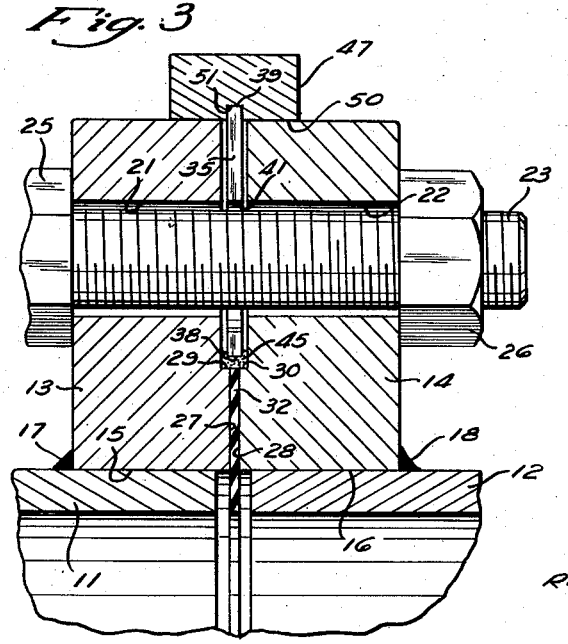
FIGURE 3 is a cross-sectional view through the coupling showing the repair clamp in place.

Referring now to the drawings in greater detail, the arrangement of the flanged pipe joint is seen most clearly in FIGURES 1 and 3. The pipe sections 11 and 12 are each provided at their ends with identical flanges 13 and 14, respectively. The pipes 11 and 12 are received within bores 15 and 16 in the flanges 13 and 14 and are rigidly secured thereto by suitable means such as welding such as indicated at 17 and 18. Each of the flanges is provided with a plurality of bolt holes, usually eight in number, as shown in FIGURE 1, which are arranged equidistantly around the flange on the same radius. The flanges are held together by means of a suitable bolt or similar fastener extending through the aligned bolt holes, and as shown in FIGURE 3, a threaded stud 23 extends through the bolt holes and is provided with nuts 25 and 26 at the ends for clamping the flanges 13 and 14 into sealing contact.

Each of the flanges has a raised annular face 27 and 28, usually approximately 1/16 inch high, which extends radially outward from the pipe receiving bore in the flange. These faces terminate at an axially extending peripheral shoulder indicated at 29 and 30 which is spaced a distance radially inward from the inner edge of the bolt holes. To provide sealing between the raised annular faces 27 and 28, a flat annular gasket 32 is placed between the raised faces. This gasket may extend radially inward to have an internal diameter less than that of the bore in the flange, and it may also extend radially outward beyond the shoulders 29 and 30 to the inner edge of the bolt holes as indicated in FIGURE 5. These radial dimensions of the gasket 32 may vary with different usage so long as the gasket extends the full radial extent of the raised annular faces on the flanges.

In the foregoing standard flanged coupling, the principal possibility of leakage occurs at the gasket 32. Such leakage may take place for a variety of reasons such as deterioration of the gasket material or, in some cases, slight warpage of the flange itself. Whenever this happens, the fluid within the pipe will, of course, leak out through the defective portion of the gasket. When this situation is encountered, the repair flange as shown in FIGURE 1 is easily applied to the leaking pipe flange without disturbing the existing joint and without loosening the nuts 25 and 26 on stud 23.

Figure 2:
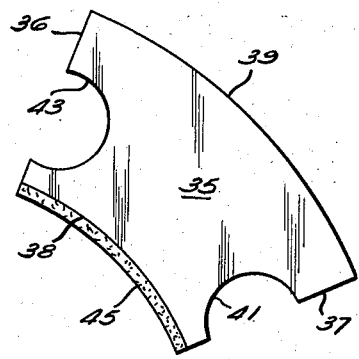
FIGURE 2 is an enlarged view of a segment plate employed in the clamp of FIGURE 1.

The repair clamp includes a plurality of segment plates 35, one of which is shown in greater detail in FIGURE 2. All of these segment plates are identical and they are equal in number to the number of bolt holes and hence to the spaces between the bolt holes. These segment plates are made from a suitable rigid material such as flat steel plate to have a uniform thickness such that they will freely slide radially into the flange joint within the axial gap radially outward of the shoulders 29 and 30. The width of this gap is equal to the sum of the thickness of the raised faces 27 and 28 and the thickness of the gasket 32. Since the gasket 32 is generally made quite thin and is usually substantially thinner than the height of the raised faces 27 and 28, the segment plates 35 preferably have a thickness equal to the combined thickness of both raised faces so that it fits within the gap between the flanges with a total clearance on both sides equal to the thickness of gasket 32. In a typical example of a flanged joint, the raised faces will have a height above the remainder of the flange of approximately $\frac{1}{16}$ inch and the gasket 32 will be between $\frac{1}{32}$ up to a maximum of $\frac{1}{16}$ inch thick. Therefore, the segment plate for this joint will preferably be made about $\frac{1}{8}$ inch thick.

The segment plates 35 have radial edges or faces 36 and 37 together with an arcuate inner edge or face 38 formed on the same radius as the shoulders 29 and 30 and an outer edge or face 39. Along the one edge 37, the segment plate is provided with a semi-circular cut-out 41 having a radius greater than that of the bolt holes in the flanges. The cut-out 41 is formed with the center of the radius lying on the line of edge 37. Along the other edge 36 another cut-out 43 is provided with the same radius as that of cut-out 41 but with the center of the cut-out spaced inwardly from the edge 36 so that the cut-out 43 has a depth greater than the radius. In order to provide sealing when the segment plates 35 are in place, each segment plate carries a strip of gasket material 45 cemented to the inner edge 38. This gasket strip 45 may be made of any suitable gasket material such as rubber or cork and preferably has a thickness both radially and axially substantially the same as the thickness of the segment plate 35. If desired, the gasket can be a separate strip wrapped around the shoulders before the segment plates are assembled.

In assembling the repair clamp on the leaking flange, the segment plates 35, because of the cut-outs 41 and 43, can be slipped in place around the studs 23 without removal of the studs. The spacing of the deep cut-out 43 allows each of the segment plates to be temporarily displaced circumferentially a small amount from its original position to permit the adjacent segment plate to be inserted. These plates are inserted with the edge 36 leading so that the segment plate can be moved so that the stud enters the full depth of the cut-out 43, so that the other radial edge 37 will clear the adjacent stud as the segment plate is slipped into position.

After all of the segment plates are in position between the coupling flanges, the segment plates are centered between the studs, and the clamping ring 47 is applied to hold the segments in position. The clamping ring 47 is formed by a pair of semicircular ring halves 48 and 49 and has an inner periphery 50 formed on a radius corresponding to that of the outer periphery of the flanges 13 and 14. A radial groove 51 is formed in the clamping ring to receive the projecting portions of the segment plates 35 and also serves to position the clamping ring axially on the coupling flanges. Each of the ring halves 48 and 49 is provided with a lug 53 on each end with bores therein to receive freely the threaded studs 55. The studs 55 are provided with nuts 56 which can be threaded along the studs to move the adjacent lugs together and move the two ring halves 48 and 49 together to force the segment plates 35 radially inward between the flanges 13 and 14.

The segment plates 35 are made to such a dimension that with the gasket strip 45 in place, this gasket strip will come into contact with the shoulders 29 and 30 of the raised faces 27 and 28, as shown in FIGURE 4, while the outer edges of the segment plates project beyond the periphery of the flanges 13 and 14 a distance substantially greater than the depth of the groove 51 in the clamping ring. This allows movement for the ring halves 48 and 49 to move inward and force the segment plates radially inward to compress the gasket strip 45 into the position shown in FIGURE 3 before the ring halves make abutting contact with the outer peripheries of the flanges 13 and 14 to limit further movement of the clamping rings and to prevent excessive compression of the gasket strips 45. The cut-outs 41 and 43 are made to a radius considerably larger than that of the studs 23 to allow this free radial movement of the segment plates without interference by contact with the studs.

Normally, it is desirable to cut away any portion of the gasket 32 between the raised faces 37 and 38 that projects radially outward beyond the shoulders 29 and 30. This allows the gasket strips 45 in the segment plates to seal against the shoulders 29 and 30 and by the compression applied to the segment plates, this gasket material is deformed to completely cover the area between the raised faces and even the full width of the axial gap between the outer parts of the flanges as shown in FIGURE 3. However, it is not necessary to cut away the projecting portions of gasket 32 and, if desired, the gasket may be allowed to project radially outward beyond the shoulders 29 and 30 as shown in FIGURE 5. In this case, the insertion of the segment plates 35 and the radially inward movement by the action of the clamping ring 47 will cause the existing gasket material to deform and aid the sealing action of the gasket strips 45 as shown in FIGURE 6 to provide a fluid-tight seal between the flanges radially outward of the shoulders 29 and 30.

A modified form of the segment plate is shown in FIGURE 7. The segment plates 60 have unbroken radial edges 61 and inner and outer peripheral edges 62 and 63 having the same dimensions as those of the segment plate 35 shown in FIGURE 1. The only difference is the manner in which the openings are provided for the flange studs 23, and hence the manner in which the segment plates are inserted between the coupling flanges 13 and 14. The segment plates 60 are provided with a circular bore or opening 65 adjacent the mid-portion having a diameter substantially larger than that of the studs 23. The radius of the openings 65 will be the same as that of cut-outs 41 and 43 of the segment plate 35 to permit the same range of radial movement for the segment plates.

In order to install the segment plates 60 within the coupling, it is necessary to remove the studs 23. In order to prevent loosening of the flanged coupling which might increase the leak, the studs 23 are removed one at a time to allow the insertion of one of the segment plates 60, after which the stud is passed back through the bolt holes 21 and 22 and through the opening 65 in that segment plate and the nuts 25 and 26 retightened. After this has been done for one stud and one segment plate, the same process is repeated for each of the other studs until all of the segment plates 60 have been installed in the coupling. After this has been done, the clamping ring 47 is applied to the flange to force the seegment plates 60 inward so that the gasket strips 64 on each of the segment plates make sealing contact in the same manner as in the embodiment of FIGURE 1.

Although several embodiments of the invention have been shown and described in detail, it is understood that various modifications and rearrangements will become apparent to those skilled in the art upon more complete comprehension of the invention, and such modifications and rearrangements may be resorted to without departing from the scope of the invention as defined in the following claims.

What is claimed is:

1. A repair clamp for a leaking flanged pipe coupling of the type including opposed radial flanges having raised centrally disposed annular faces and a gasket between the raised faces whereby the portions of the flanges radially outward of the raised annular faces are spaced apart by an annular axial gap and provided with axially extending bolt means for securing the flanges together, said repair clamp comprising a plurality of segment plates adapted to be inserted radially into the axial gap between the flanges, said plurality of segment plates extending circumferentially around said axial gap, each of said segment plates having an inner peripheral face having a radius substantially equal to the radius of the outer periphery of said raised faces, each of said segment plates having an outer edge extending adjacent the outer periphery of said flanges, gasket means positioned between the outer periphery of said raised faces and the inner peripheral faces of said segment plates, and clamp means extending around the outer periphery of said flanges and adapted to force said segment plates radially inward to compress said gasket means between the inner peripheral faces of said segment plates and the outer periphery of said raised faces to seal against leakage between said raised faces.

2. A repair clamp for a leaking flanged pipe coupling of the type including opposed raidal flanges having raised centrally disposed annular faces and a gasket between the raised faces whereby the portion of the flanges radially outward of the raised annular faces are spaced apart by an annular axial gap and provided with axially extending bolt means for securing the flanges together, said repair clamp comprising a plurality of segment plates adapted to be inserted radially into the axial gap between the flanges, said plurality of segment plates extending circumferentially around said axial gap, each of said segment plates having an inner peripheral face having a radius substantially equal to the radius of the outer periphery of said raised faces, each of said segment plates having an outer edge extending adjacent the outer periphery of said flanges, arcuate segments of gasket material carried by and extending the full circumferential extent of the inner peripheral faces of said segment plates, and clamp means extending around the outer periphery of said flanges and adapted to force said segment plates radially inward to compress said gasket segments between the inner peripheral faces of said segment plates and the outer periphery of said raised faces to seal against leakage between said raised faces.

3. A repair clamp for a leaking flanged pipe coupling of the type including opposed radial flanges having raised centrally disposed annular faces and a gasket between the raised faces whereby the portions of the flanges radially outward of the raised annular faces are spaced apart by an annular axial gap and provided with axially extending bolt means for securing the flanges together, said repair clamp comprising a plurality of segment plates adapted to be inserted radially into the axial gap between the flanges, said segment plates providing opening means to receive said bolt means, said plurality of segment plates extending circumferentially around said axial gap, each of said segment plates having an inner peripheral face having a radius substantially equal to the radius of the outer periphery of said raised faces, said segment plates having an outer edge extending adjacent the outer periphery of said flanges, gasket means positioned between the outer periphery of said raised faces and the other peripheral faces of said segment plates, and clamp means extending around the outer periphery of said flanges and adapted to force said segment plates radially inward to compress said gasket means between the inner peripheral faces of said segment plates and the outer periphery of said raised faces to seal against leakage between said raised faces.

4. A repair clamp for a leaking flanged coupling of the type including opposed radial flanges having raised centrally disposed annular faces and a gasket between the raised faces whereby the portions of the flanges radially outward of the raised annular faces are spaced apart by an annular axial gap and provided with axially extending bolt means for securing the flanges together, said repair clamp comprising a plurality of segment plates adapted to be inserted radially into the axial gap between the flanges, said segment plates having circular openings therein to receive said bolt means, said circular openings having a diameter substantially greater than the diameter of said bolt means to permit limited radial movement of said segment plates without interference by said bolt means, said plurality of segment plates extending circumferentially around said axial gap, each of said segment plates having an inner peripheral face having a radius substantially equal to the radius to the outer periphery of said raised faces, said segment plates having an outer edge extending radially outward beyond the outer periphery of said flanges, arcuate gasket segments carried by and extending the full circumferential extent of the inner peripheral faces of said segment plates, and clamp means extending around the outer periphery of said flanges and adapted to force said segment plates radially inward to compress said gasket means between the inner peripheral faces of said segment plates and the outer periphery of said raised faces to seal against leakage between said raised faces.

5. A repair clamp for a leaking flanged pipe coupling of the type including opposed radial flanges having raised centrally disposed annular faces and a gasket between the raised faces whereby the portions of the flanges radially outward of the raised annular faces are spaced apart by an annular axial gap and provided with axially extending bolt means for securing the flanges together, said repair clamp comprising a plurality of segment plates equal to the number of bolt means and adapted to be inserted radially into the axial gap between the flanges, each of said segment plates having semi-circular cut-outs on the radially extending faces of said segment plates, said cut-outs being formed with a radius substantially greater than that of said bolt means to receive said bolt means between adjacent segment plates, said plurality of segment plates extending circumferentially around said axial gap, each of said segment plates having an inner peripheral face having a radius substantially equal to the radius of the outer periphery of said raised faces, said segment plates having an outer edge extending radially outward beyond the outer periphery of said flanges, arcuate gasket segments carried by and extending the full circumferential extent of the inner peripheral faces of said segment plates, and clamp means extending around the outer periphery of said flanges and adapted to force said segment plates radially inward to compress said gasket means between the inner peripheral faces of said segment plates and the outer periphery of said raised faces to seal against leakage between said raised faces.

6. A repair clamp as set forth in claim 5 wherein one of said semi-circular cut-outs on each of said segment plates is formed with the center spaced circumferentially inward from said radially extending face of the segment plate to give said one cut-out a circumferential depth greater than the radius of said one cut-out.

7. A repair clamp for a leaking flanged pipe coupling of the type including opposed radial flanges having raised centrally disposed annular faces and a gasket between the raised faces whereby the portions of the flanges radially outward of the raised annular faces are spaced apart by an annular axial gap and provided with axially extending bolt means for securing the flanges together, said repair clamp comprising a plurality of segment plates adapted to be inserted radially into the axial gap between the flanges, said plurality of segment plates extending circumferentially around said axial gap, each of said segment plates having an inner peripheral face having a radius substantially equal to the radius of the outer periphery of said raised faces, said segment plates having an outer edge extending radially outward beyond the outer periphery of said flanges, gasket means positioned between the outer periphery of said raised faces and the inner peripheral faces of said segment plates, a pair of semi-circular clamp members extending around the outer periphery of said flanges, and means to adjustably secure said semi-circular clamp members together at each of the opposed adjacent ends of the clamp member to force said segment plates radially inward to compress said gasket means between the inner peripheral faces of said segment plates and the outer periphery of said raised faces to seal against leakage between said raised faces.

8. A repair clamp as set forth in claim 7 wherein said clamp members are provided on the inner peripheral face with a circumferentially extending groove to receive the radially outer portions of said segment plates.

References Cited in the file of this patent
UNITED STATES PATENTS

| | | |
|---|---|---|
| 866,395 | Skinner | Sept. 17, 1907 |
| 1,620,154 | Furman | Mar. 8, 1927 |
| 1,876,415 | Heard | Sept. 6, 1932 |